(12) United States Patent
Georg

(10) Patent No.: US 6,429,960 B1
(45) Date of Patent: Aug. 6, 2002

(54) OPTICAL COMPONENT

(75) Inventor: Andreas Georg, Freiburg (DE)

(73) Assignee: Fraunhofer-Gesellschaft zur Forderung der Angewandten Forschung E.V. (DE)

( * ) Notice: Subject to any disclaimer, the term of this patent is extended or adjusted under 35 U.S.C. 154(b) by 0 days.

(21) Appl. No.: 09/673,700

(22) PCT Filed: Mar. 15, 1999

(86) PCT No.: PCT/EP99/01684
§ 371 (c)(1),
(2), (4) Date: Oct. 19, 2000

(87) PCT Pub. No.: WO99/53372
PCT Pub. Date: Oct. 21, 1999

(30) Foreign Application Priority Data

Apr. 15, 1998 (DE) .......................... 198 16 675

(51) Int. Cl.$^7$ .............................. G02F 1/153; G02F 1/15
(52) U.S. Cl. ........................................ 359/273; 359/265
(58) Field of Search ................................ 359/265, 272, 359/273, 275; 428/426; 544/347; 546/257

(56) References Cited

U.S. PATENT DOCUMENTS

| 3,899,333 | A | * | 8/1975 | Berman et al. | 430/413 |
| 4,889,414 | A | * | 12/1989 | Rauh et al. | 359/273 |
| RE34,469 | E | * | 12/1993 | Cogan et al. | 359/269 |
| 5,604,626 | A | * | 2/1997 | Toewee et al. | 359/265 |
| 5,847,858 | A | * | 12/1998 | Krings et al. | 359/265 |
| 6,011,642 | A | * | 1/2000 | Vink et al. | 359/273 |
| 6,020,987 | A | * | 2/2000 | Baumann et al. | 359/273 |
| 6,118,572 | A | * | 9/2000 | Kostecki et al. | 359/265 |
| 6,157,479 | A | * | 12/2000 | Heuer et al. | 359/265 |
| 6,175,441 | B1 | * | 1/2001 | Heuer et al. | 359/273 |

FOREIGN PATENT DOCUMENTS

| DE | 024 36 174 | 2/1975 |
| DE | 195 47 327 | 7/1997 |
| GB | 1 522 226 | 8/1978 |
| WO | 96/24882 | 8/1996 |
| WO | 97/35227 | 9/1997 |
| WO | 97/45767 | 12/1997 |

OTHER PUBLICATIONS

Bechinger et al., "Photoelectrochromic Windows and Displays," Nature, 383, pp. 607–610 (Oct. 17, 1996).
Chemical Abstracts, 105 (4), p. 583 (Jul. 28, 1986 (XP–002109284)).
Monk et al., "Electochromic Display Devices of Tungstic Oxide Containing Vanadium Oxide or Cadmium Sulphide as a Light–Sensitive Layer," Electochimica Acta, 38 (18), pp. 2759–2764 (Jan. 6, 1993 (XP–000676410)).

* cited by examiner

Primary Examiner—Georgia Epps
Assistant Examiner—Gary O'Neill
(74) Attorney, Agent, or Firm—Leydig, Voit & Mayer, Ltd.

(57) ABSTRACT

Described is an optical element having a region arranged on a first substrate and comprising at least one layer, the region containing a reactive material, a dye, and ion storage, whereby a redox system and at least one ion are present in the ion storage. The dye is hereby in contact with the reactive material, either directly or by means of a conductive layer, such that an optically induced charge transfer flow (forward reaction) can be achieved from the dye to the reactive material, either directly or by means of the conductive layer within the region that comprises at least one layer. A charge carrier return flow (reverse reaction) can occur via the same interface as the forward reaction, or alternatively, via external wiring and a second electrode. The external wiring can contain a switch.

21 Claims, 1 Drawing Sheet

OPTICAL COMPONENT

Figure 1:
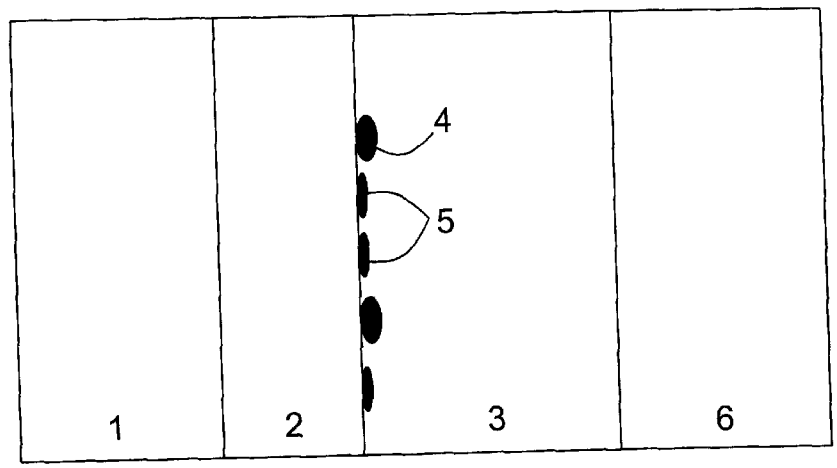

The invention relates to an optical element having a region that is arranged on a first substrate and that comprises at least one layer, said region containing a reactive material, a dye, and ion storage, whereby in said ion storage are present at least one redox system and at least one ion that can penetrate into said reactive material.

A number of optical elements exist that reversibly change their optical or electrical properties by means of illumination or external wiring. Electrochromic cells and electrochromic dye-sensitive solar cells are cited as examples.

An electrochromic cell having two electrodes and an electrolyte that is arranged between said electrodes and that contains dissociated LiI is known from "Photoelectrochromic Windows and Displays," C. Bechinger et al., Nature, Vol. 383, Oct. 17, 1996, pp. 608–610. One of the two electrodes comprises glass that is coated with indium-tin oxide (ITO), upon which electrochromic $WO_3$ is applied as a reactive material. The other electrode comprises nanocrystalline $TiO_2$, upon which a dye layer is arranged.

The absorption of incident light by the dye causes an injection of electrons into the $TiO_2$ layer, which functions as a charge carrier collecting layer. The oxidized dye is then reduced again by electron transfer from the iodine ions. As a result of this process, a potential difference forms between the two electrodes. If said electrodes are now electrically connected by an external circuit, the electrons injected into the $TiO_2$ flow into the colorless $WO_3$ layer, and at that point lead to reduction and a resultant coloration of said $WO_3$. Simultaneously with the electrons, lithium ions migrate from the electrolyte into said $WO_3$ to maintain charge neutrality. In contrast to electrochromic cells, said element for colorization of the $WO_3$ layer advantageously requires no external voltage source.

An equilibrium state arises in this element as a function of the intensity of illumination. If the illumination is reduced by closing the circuit, the electrons flow back into the electrolyte and the coloration disappears. On the other hand, when the circuit is opened, the illumination is diminished, and the electrons remain in the $WO_3$ layer and the color is maintained for several hours.

However, decolorization for this electrochromic element is possible only in the unilluminated state. The reaction that leads to decolorization in the unilluminated state necessarily occurs also during colorization in the illuminated state. The dye reaction is thus slower, and the colorization that arises in the equilibrium state is less than would be the case without the parallel decolorization reaction. A desired rapid decolorization can be achieved only with simultaneous reduction of the rate and depth of the dyeing. A further disadvantage is that external wiring cannot be dispensed with, and the function of such optical elements necessarily requires the presence of two electrodes.

Proceeding from the disadvantages of the prior art, the object of the invention is to provide an optical element that allows a more rapid and intensive optically-induced alteration of the optical or electrical parameters of a stratified region, and that additionally can be designed more simply than comparable optical elements of the prior art.

This object is preferably achieved by the characterizing features of the invention. Advantageous embodiments and further developments of the invention will be apparent from the description of the invention provided herein.

An optical element having a substrate and a region that is arranged thereon and that comprises at least one layer, said region containing a reactive material, a light-sensitive material (hereinafter called a dye), and ion storage, allows rapid and intense alteration of the properties of said reactive material, provided that said dye is in contact with said reactive material, either directly or separated by no more than one electrically conductive layer. This development of said optical element assures direct charge transfer between said dye and said reactive layer within the stratified region, and allows the electrically conductive electrodes and wiring (FIG. 1), as instructed by prior art, to be dispensed with. By means of an advantageous spatial separation of the colorization and decolorization reactions, a switchable development of the invention (FIG. 2) avoids the simultaneous appearance of said colorization and decolorization reactions that occur with traditional electrochromic optical elements. In this manner, the colorization is, in principle, more rapid and more intensified. Furthermore, this development, in contrast to the conventional elements, allows switchable decolorization in the illuminated state.

With each charge carrier that is injected from the dye into the reactive material, an oppositely charged ion also migrates from ion storage into said reactive material to compensate for said charge carrier. In the region of the ion storage containing a redox system, a redox reaction therefore takes place to maintain the charge neutrality of the dye. Although the optical element according to the invention can be more simply designed compared to optical elements of prior art; since, according to a feature of the invention, semiconductors, electrodes, and an external circuit in particular can be dispensed with, the optically induced alteration of the optical or electrical parameters of said reactive material according to the invention is advantageously achieved more quickly.

Suitable as reactive materials are those substances whose optical or electrical properties, such as conductivity, change as a result of the charge carriers injected from the dye. Thus, for example, electrochromic materials can be used whose color, and optionally, electrical properties, changes due to an induced alteration of the oxidative state caused by the injected charge carriers. Substances suitable for dyes include those that are used in the area of dye-sensitive solar cells. Said dye and reactive material can be arranged either in layers atop one another or together as a single layer. The use of porous layers, such as those produced from the solar get method, of reactive materials is thus conceivable, whereby said dye is embedded in the pores of said reactive material. Intermixture of said reactive material and said dye leads to further improvement of the intensity and speed of the optically induced alteration of the parameters of said reactive material.

Substances suitable as ion storage are those that can accept ions and also display at least slight ion conductivity. The requirement for ion conductivity of said ion memory, however, is significantly less than for electrochromic dye-sensitive solar cells, for example, since it is usually not necessary to maintain an ionic current between two electrodes. It is only in the decolorization process in the illuminated state, for a switchable development (FIG. 2), that an ionic current must flow through the entire ion storage, from the left to the right electrode. Otherwise, a local reaction of said ion storage directly at the interface, for example, is sufficient.

The ion storage contains at least one ion that can penetrate into the reactive material as compensation for the charge carriers injected from the dye, and also contains at least one redox system that maintains the charge neutrality of said dye and, optionally, of said ion storage. Said ion storage can likewise have a stratified design, and can be arranged, for example, on a dye layer applied to said reactive material or on a layer containing said dye and said reactive material as a mixture. However, it is also possible to have a mixture of reactive material, dye, and ion-storing substance in a single layer. Thus, the interstices of a nanocrystalline reactive material can be filled with a liquid ion-storing electrolyte and said dye.

Other substances such as catalysts or charge carrier-collecting materials can also be incorporated into a layer of the region according to the invention that contains at least one layer, or as an additional layer in said region. Such materials promote, for example, the process kinetics or stability of the system. The material that collects charge carriers is preferably arranged between the dye and the reactive material, and improves the charge transfer efficiency of said dye in said reactive material, thereby improving the process kinetics.

For an element according to the invention, illumination creates an equilibrium state between, on the one hand, an alteration of the optical or electrical properties, or both of said properties, of the reactive material induced in same by the injection of charge carriers (forward reaction), and on the other hand, a simultaneous reverse reaction. Said reverse reaction (charge carrier return flow) can take place via the same interface, between the dye and said reactive material, as for the forward reaction, or alternatively, via external wiring and a second electrode that is arranged on the side of the ion storage facing opposite said reactive material and that is designed as a substrate or layer. Said external wiring can contain any desired switchable element.

The equilibrium state under illumination is known as an intercalated state, since said state can be characterized, among other criteria, by the number of compensating ions from ion storage that have penetrated (intercalated, for example) into the reactive material. If the illumination is reduced, the reverse reaction dominates the forward reaction—although said reverse reaction can be strongly kinetically inhibited—until an equilibrium state has again developed at a lower level (deintercalated state). If the reverse reaction kinetics are kept at a slow rate, the intercalated state can be maintained for several hours, even in the dark, and the optical element functions as storage. If this storage effect is not desired, the reverse reaction kinetics can be accelerated by the addition of a catalyst, for example. External wiring of the optical element according to the invention can also influence said reverse reaction.

Figure 2:
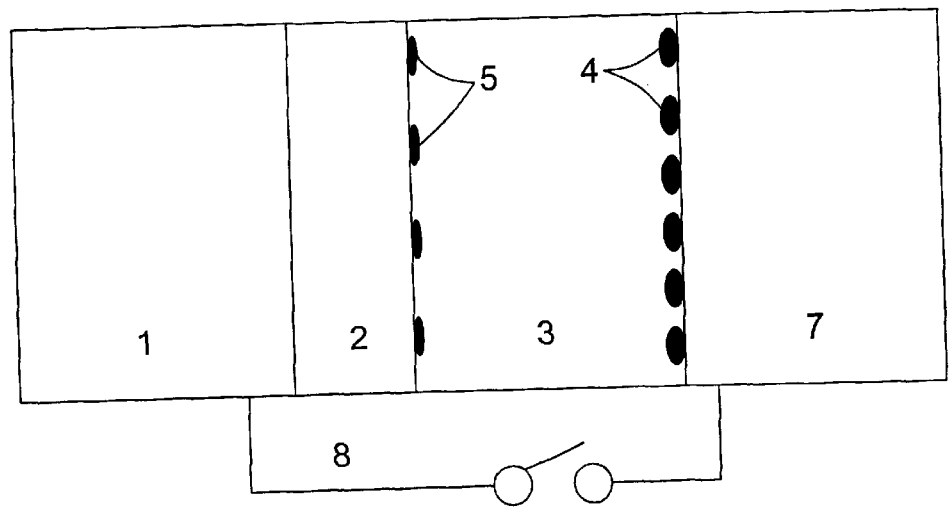

Further details and preferred developments of the invention arise from the figures and the following described example embodiments. The following are shown in the figures:

FIG. 1 is a schematic representation of an optical element according to the invention, without external wiring; and FIG. 2 is a schematic representation of an optical element according to the invention, with external wiring.

The optical element illustrated in FIG. 1 has a particularly simple design. Said optical element has a stratified region, arranged on a glass substrate 1, said region comprising a layer 2 composed of $WO_3$ (reactive material) and an ion-storing layer 3 composed of acetonitrile. An inorganic dye 5 (cis-bis(isothiocyanato)bis(2,2'-bipyridyl-4-4'-dicarboxylato) ruthenium (II) "N3") is applied to said $WO_3$ in the form of a transparent and ion-permeable monolayer. Said dye 5 can be applied by wetting the $WO_3$ surface. Introduction of said dye 5 into said $WO_3$ layer 2 is not absolutely necessary for said optical element to function. Optimally, catalyzing platinum 4 is arranged at the interface between said reactive material 2 and said ion-storing layer 3.

Said acetonitrile layer 3 contains dissolved LiI and $I_2$. On the side of said acetonitrile layer 3 facing opposite said reactive material is arranged an optional substrate 6, which protects said optical element from mechanical influences. At least one of the two substrates 1 or 6 must be at least partially transparent in the region of the excitation wavelength of said dye 5. The other substrate 1 and 6 can be metallized, absorptive, or even transparent.

The incidence of light causes the dye 5 to inject electrons into the $WO_3$, whereupon lithium ions from ion storage 3 intercalate into said $WO_3$ to maintain charge neutrality or layer 2. The transparent $WO_3$ is reduced according to the formula $WO_3+xLi^++xe^-\leftrightarrows Li_xWO_3$, and thereby changes its color as well as its electrical properties. The redox reaction $3I^-\leftrightarrows I_3^-+2e^-$ proceeds in the ion storage layer 3 to maintain charge neutrality of the oxidized dye 5 or said ion storage. The reverse reaction of this redox reaction is catalyzed by the platinum 4, thus accelerating deintercalation of the system when the illumination is diminished.

A layer, not shown, of a collecting semiconductor ($TiO_2$, for example) for the electrons emitted by the dye 5 could also be arranged between the $WO_3$ layer 2 and said dye 5. A semiconductor material adapted to said dye 5 and reactive material 2 increases the efficiency of the charge carrier injection from said dye 5 to said reactive material 2, thereby increasing the reaction rate as well.

Since the element represented in FIG. 1 manages without electrodes and external wiring, which always have a final electrical resistance, colorization advantageously occurs more quickly than with electrochromic elements of prior art. For large-surface elements in particular, the sheet resistance of transparent electrodes has proven to be extremely disadvantageous.

The addition of catalysts that promote the decolorization reaction can improve the decolorization rate of the system in the development shown in FIG. 1. However, this leads to a reduction in the rate and depth of colorization. This problem is avoided in the expanded design of FIG. 2 by spatial separation of the colorization and decolorization reactions. FIG. 2 shows a switchable optical element according to the invention with external wiring 8 comprising a switch. Substrates 1 and 7, designed as transparent electrodes, comprise $TiO_2$ doped with fluorine (Pilkington, sheet resistance 30 ohm) and are in electrical contact with said wiring 8. Between the two substrates 1, 7 are successively arranged a 1-$\mu m$ thick $WO_3$ layer 2, a thin layer containing the dye 5, an acetonitrile ion storage layer 3 containing dissolved LiI and $I_2$, and a 10-nm thick, platinum-containing layer 4 applied to said substrate 7. Instead of applying the catalyst 4 onto said substrate 7, said catalyst 4 could also be introduced into said substrate 7, or said substrate 7 could be prepared completely from said catalyst 4. Said substrate 7 can be designed according to the invention not only as a preferably conductive and catalyst-containing coating, but also as a plate-like element. The surface of said element is about 5×5 $cm^2$.

The switchability of the optical element according to FIG. 2 is based on the fact that a slow reverse reaction occurs at the working electrode composed of the conductive substrate 1 and the $WO_3$ layer 2 of the $WO_3$ facing the ion storage layer 3, whereas said reverse reaction proceeds rapidly at the counter electrode composed of the conductive substrate 7 and coating containing platinum 4, since the redox reaction in said ion storage 3 is catalyzed by said platinum 4.

Two such cells of identical construction were illuminated in parallel in a solar simulator, whereby the switch was open at the first cell and was closed at the second cell. When the wiring was open, the colorization was significantly deeper than when the wiring was closed. For both cells, colorization was higher than in the unilluminated state before the start of illumination. Thus, switchability could be demonstrated in the illuminated state. In a second experiment, two cells of identical construction were illuminated with the wiring open. The decolorization after illumination ceased was then measured, whereby the wiring was closed in one cell. Decolorization occurred for both cells, although the process was markedly slower for the cell with open wiring than for the cell with closed wiring. Switchability could thus be established in the unilluminated state as well.

As an alternative or addition to the switch, the external circuit 8 can contain an adjustable resistor, by which the equilibrium between the forward and reverse reactions can be regulated. In this manner, continuously adjustable intercalation rates in the illuminated state are possible. Limited deintercalation in the unilluminated state is possible, for example, by limiting the time that said switch is closed.

In addition to $WO_3$, which is cited in the embodiment examples, $MoO_3$, $V_2O_3$, $NiO_x$, or $TiO_2$ are examples of a suitable reactive material 2. All these materials have electrochromic properties. Suitable ion storage includes solvents, such as propylene carbonate, acetonitrile, ethylene carbonate/propylene carbonate, methoxyprionitrile, glutarodinitrile, or N-methyloxacolidinone, as well as polymers (polyethylene oxide, polypropylene oxide) or inorganic solids such as metallic oxides. To these ion-storing substances are added at least one component of the redox system ($I^-$, for example) and the ion ($Li^+$, for example). Examples of the dye 5 include inorganic semiconductors ($TiO_2$ or Si), organic dyes, inorganic ruthenium compounds, anthocyanines, chlorophylls, or perylene dyes.

The substrates can be either self-conductors or conductive. Conducting or conductively coated substrates can function as electrodes. Preferred transparent electrodes are those that comprise indium-tin oxide (ITO), fluorine-dosed tin oxide, or coated silver. Pt, Pd, Ni, Au, Os, Re, Ir, Ru, and Rh are particularly suited as catalysts 4. The substrate as well as the ion storage and dye are preferably transparent.

The dye layer can either be so thin that it is translucent, or the dye 5 used can be ultraviolet-absorbing. In both cases, the region containing said dye 5 is to be considered transparent.

The optical elements according to the invention are particularly suited as optical switches, optical storage, or elements with variable transmission or reflection for protection from overheating or glare. Windows or panes in the building or automotive sectors are cited as concrete examples.

What is claimed is:

1. Optical element comprising a region arranged on a first substrate, said region comprising at least one layer, a reactive material, a dye, a catalyst, and ion storage, whereby at least one component of a redox system and at least one ion which can penetrate into said reactive material are present in said ion storage, wherein said dye is embedded in said reactive material, or a layer containing said dye is arranged between the layer of the reactive material and the ion storage layer, or that said dye is in contact by means of an electrically conductive layer, and a charge transfer occurs between said dye and said reactive material within said region comprising at least one layer.

2. Optical element according to claim 1, wherein the region comprising at least one layer contains a layer of the reactive material and an ion storage layer arranged thereon.

3. Optical element according to claim 1, wherein the region comprising at least one layer has a layer containing the reactive material as well as the dye and the ion storage.

4. Optical element according to claim 1, wherein the reactive material is an electrochromic material.

5. Optical element according to claim 1, wherein the conductive layer is a semiconductor layer.

6. Optical element according to claim 1, wherein the region comprising at least one layer is arranged between the first substrate and a second substrate.

7. Optical element according to claim 6, wherein the second substrate is designed as a coating.

8. Optical element according to claim 6, wherein both substrates comprise a conductive material, or are coated with a conductive material on a side facing the region comprising at least one layer.

9. Optical element according to claim 8, wherein the electrical wiring is provided, and that both substrates are in electrical contact with said external wiring.

10. Optical element according to claim 9, wherein the wiring contains a switch.

11. Optical element according to claim 10, wherein the switch is switchable in the unilluminated state of said optical element to control deintercalation rate for a limited time.

12. Optical element according to claim 11, wherein the wiring contains an adjustable resistor.

13. Optical element according to claim 1, wherein one layer containing catalyst is arranged between the ion storage layer and the layer of the reactive material.

14. Optical element according to claim 6, wherein the second substrate comprises a catalyst or contains a catalyst or is provided with a coating containing a catalyst.

15. Optical element according to claim 1, wherein, of the first substrate and the second substrate, at least one is transparent.

16. Optical element according to claim 1, wherein the dye or the layer containing said dye is transparent.

17. Optical switch comprising the optical element according to claim 1.

18. Optical storage comprising the optical element according to claim 1.

19. Elements with variable transmission or reflection comprising the optical element according to claim 1.

20. A window comprising the optical element according to claim 1.

21. A window pane comprising the optical element according to claim 1.

* * * * *